Nov. 17, 1959    W. R. O'NEILL    2,913,655
POSITIONING APPARATUS FOR DRIVEN MEANS
Filed Jan. 21, 1959                    2 Sheets-Sheet 1

INVENTOR.
WILLIAM R. O'NEILL
BY
ATTORNEY

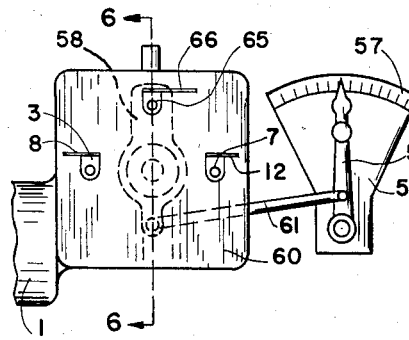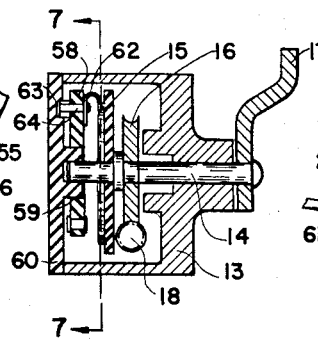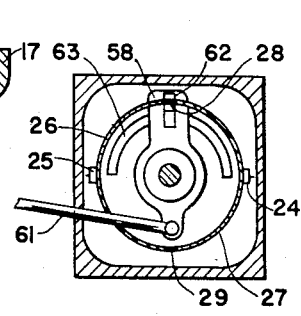
FIG. 5  FIG. 6  FIG. 7
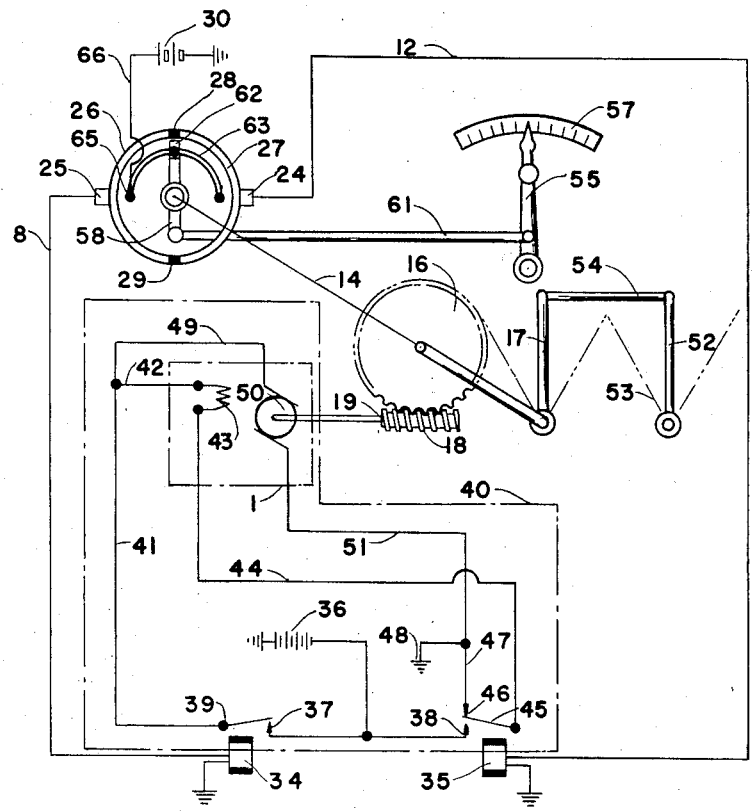
FIG. 8
INVENTOR.
WILLIAM R. O'NEILL
ATTORNEY

United States Patent Office 2,913,655
Patented Nov. 17, 1959

2,913,655

POSITIONING APPARATUS FOR DRIVEN MEANS

William R. O'Neill, Detroit, Mich.

Application January 21, 1959, Serial No. 788,071

4 Claims. (Cl. 318—467)

This invention relates to a positioning apparatus for a driven unit wherein the desired position of the driven unit, within a given range, is selected manually, and electrically operated control and power means follows the desired manual selection.

Due to the requirements of the positioning of the driven unit being both fixed and variable, this invention is capable of meeting such requirements as will appear from the description and operation of the apparatus.

The driven units requiring positioning are innumerable in commerce and industry and include such various items as transmission selecting, carbureto throttling, steering dirigible craft, machine components, radio and electronic tuning, antenna positioning and the like. From these applications it is readily seen that some require fixed and some require variable positioning.

Due to the novel design of this apparatus a few of its unique features become apparent from tests run on its performance. The apparatus repeated position consistently within the range of less than .0002 of an inch using a throw of one inch from the center of the driven shaft. The apparatus is designed to have inherent electric dynamic braking on both sides of the positioning locus. Both the auxiliary and power circuits have fewer parts and contacts than conventional devices. This would be apparent whether conventional relays or static control devices were used for the logic circuits. As the description and operation of this apparatus proceeds herein, it will become increasingly apparent that there are fewer elements subject to wear and consequently greater reliability of the exact positioning repetition resulting therefrom.

One of the objects of this invention, therefore, is to provide a positioning apparatus for a driven unit consisting of a relatively small number of commercially available or easily manufactured parts.

Another object of the invention is to provide a positioning apparatus adapted to both variable and fixed positioning of the driven unit.

A still further object of the invention is to provide a positioning apparatus that is extremely sensitive in repeating to the locus of the selected position within a great degree of accuracy in the driven unit.

It is an object of this invention to provide electric dynamic braking for juxtapositioning the driven unit with a relatively few number of commercially available parts and simplified electric circuitry.

These and other objects and advantages will become apparent from the following specification and accompanying drawings in which:

Fig. 5 is an end elevational view of the variable positioning form of the invention showing the position of the motor and electric connections on the end plate, and a manually operable selecting device coupled to a selector arm shown in dotted lines.

Fig. 6 is a cross sectional view taken along the line 6—6 of Fig. 5, showing the elements of the power control unit.

Fig. 7 is a sectional view taken along the line 7—7 in Fig. 6, showing the circular position of the variable wiper and the brushes in contact with the commutator of the circular switch member.

Fig. 8 is a diagrammatic view and wiring diagram of the variable positioning form of the invention, showing the interrelation of the power operated member with the auxiliary and power electric control circuits.

The specific figures and the accompanying description are intended merely to illustrate the invention but not to impose limitations on the claims. For example Figs. 1–4 illustrate one form of the invention limited to selected fixed positioning, whereas Figs. 5–8 illustrate another form adapted to variable positioning.

Figures 1, 2, 3:
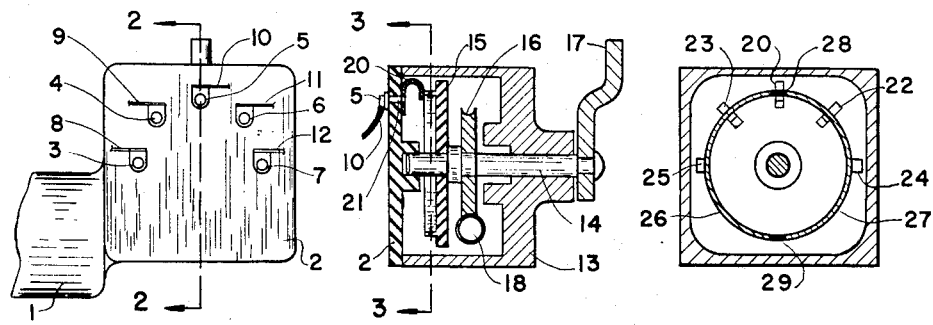
Fig. 1 is an end elevational view of the fixed positioning form of the invention showing the position of the motor and the electrical connections on the end plate.
Fig. 2 is a cross sectional view taken along the line 2—2 of Fig. 1, showing the elements of the power control unit.
Fig. 3 is a sectional view taken along the line 3—3 of Fig. 2, showing the circular position of the wipers and brushes in contact with the commutator of the circular switch member.

In Fig. 1 the relationship of the motor 1 is shown juxtapositioned to the end plate 2, and the end plate providing terminals 3–7 for connecting wires respectively 8–12.

Fig. 2 is the cross sectional view of the power control unit showing the end plate 2, affixed to the casing 13, the output shaft 14, journaled in the casing and the end plate. The circular switch member 15, the worm wheel 16, and the crank arm 17, are rigidly affixed to the output shaft. A worm 18 is keyed to the motor shaft 19, Fig. 4. The connecting wire 10 with terminal 5 is shown making contact with wiper 20 thru rivet 21 as representative of the method that all the electric connections make thru the end plate 2 to the circular switch member 15.

In Fig. 3 it will be observed that wipers 22 and 23 are electrically connected respectively to connecting wires 9 and 11. Also, brushes 24 and 25 are electrically connected respectively to connecting wires 8 and 12. Two circular electric conducting segments 26 and 27 are shown on the circular switch member electrically insulated from each other and spaced apart endwise to provide two electric neutral positions 28 and 29.

Figure 4:
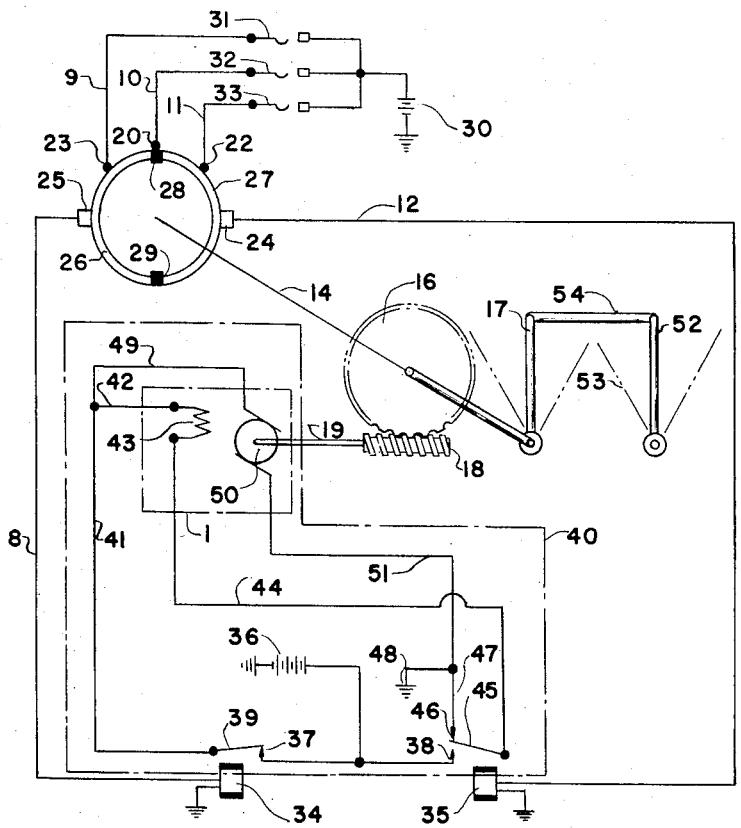
Fig. 4 is a diagrammatic view and wiring diagram of the fixed positioning form of the invention, showing the interrelation of the power operated member with the auxiliary and power electric circuits.

In Fig. 4 an auxiliary source of electric power 30 connects with manually operable electric switches 31–33 and are connected respectively with connecting wires 9–11 for energizing wipers respectively 23, 20, and 22. The balance of the auxiliary circuit is shown by connecting wire 8 connecting with the coil of relay 34, and connecting wire 12 connecting with the coil of relay 35. It now becomes apparent that both relays are normally deenergized and selectively energized only one at a time.

The power circuit indicated generally as 40 is provided with a source of electric power 36 connecting with a contact point 37 on relay 34 and contact point 38 on relay 35. When relay 34 is energized its armature 39 connects with contact point 37 and connects the motor, generally indicated as 1, in shunt connection thru lead wire 41. One path is traced thru lead wire 42, the motor field 43, lead wire 44, armature 45 and contact point 46 on relay 35, lead wire 47 to ground connection 48. The other shunt path is traced thru lead wire 49, motor armature 50, lead wire 51 to ground connection 48. When relay 35 is energized its armature 45 breaks connection with contact point 46 and connects to contact point 38 and connects the motor in series connection. The series path is now traced thru relay armature 45, lead wire 44, motor field 43, lead wires 42 and 49, motor armature 50, lead wire 51 to ground connection 48. It is now apparent that the motor will run in one direction when connected in shunt and in reverse direction when connected in series due to the reversal of the path thru the field coils while the path thru the armature remains unidirectional.

The working of the positioning apparatus will be better understood by an explanation of the function of the device when one example of a desired position is selected. Assuming the desired position of the driven means controlled by a lever arm 52 is to move it to a position 53. It is seen that lever arm 52 is coupled to the crank arm 17 by a link bar 54. In Fig. 4 it is observed that the neutral point between the two segments of the circular switch is under wiper 20. When switch 31 is closed, wiper 23 is energized making electrical connection thru segment 26, brush 25, connecting wire 8, thus energizing relay 34. When relay 34 is energized, the motor will be driven, in shunt connection, in a counter-clockwise direction as viewed in Fig. 4, until the neutral point 28 is under wiper 23 and the circuit thereby broken. The radial position of the wiper 23 being in related juxtapositioning with the selected position 53, the lever arm 52 will be pulled over into the selected position. If the momentum of the armature of the motor overruns the neutral point 28, then the wiper 23 contacts segment 27 and the relay 35 is energized and the motor will be driven in series connection in a clockwise direction to bring the neutral point 28 back under wiper 23. It is understood in the art that the instantaneous reversal of the motor also acts as a dynamic brake to stop the rotation of the motor, and in both events, the dynamic braking and the motor reversal, the said neutral point will come under the wiper.

If desired, a conventional holding circuit may be provided across switch 31 to maintain its circuit until broken by the neutral point in the first instance.

From the foregoing description it is apparent that by closing switch 32 or 33 that the positioning apparatus will function to reposition lever arm 52 as selected.

Although only three fixed positions for selection are shown in this specific embodiment, it is obvious that an additional number may be provided as required within the capabilities of the device.

Figs. 5-8 illustrate the variable form of the positioning apparatus in which like parts as shown in Figs. 1-4, are assigned like identification numbers in Figs. 5-8.

Referring to Figs. 5-8 the variable form of the positioning apparatus is provided with a manually operated selecting device consisting of a selecting lever 55 pivotally mounted in a suitable frame 56 and provided with a graduated scale 57 for indicating the position of the selecting lever thereon. A selector arm 58 is adapted to rotate about circular boss 59 of the modified end plate 60. The selecting lever is coupled to the selector arm by a Bowden cable 61 having a wire encased in an armored sheath whereby movement of the selecting lever is transmitted directly to the selector arm.

The selector arm 58 is provided with a wiper 62 which maintains continuous contact with a bus bar 63 thru rivet mounting 64. The bus bar is provided with a connecting terminal 65 which connects to the auxiliary source of power 30 thru connecting wire 66.

In this modified form it is now seen that by selecting any desired position within the range of the graduated scale, that by moving the selecting lever to such position on the graduated scale, the coupling means will move the selector arm a corresponding amount. When the selector arm is moved, for example, in a counter-clockwise direction as viewed in Fig. 8, the wiper 62 will contact segment 26 which will energize relay 34 and the motor will be driven in shunt connection in a counter-clockwise direction until the neutral point 28 is under the wiper 62, thus pulling the lever arm 52 of the driven means into the desired position as similarly described in the fixed positioning form. From the foregoing example it is readily understood that, by moving the selecting lever in any of its infinite number of positions within the range of the apparatus, the driven means will respond to the prescribed related position.

What I claim is:

1. Positioning apparatus for a driven unit having a plurality of desired predetermined positions for the driven unit, comprising, an auxiliary electric circuit, a power control means and a power control electric circuit, said auxiliary electric circuit having manually operated electric switches for initially selecting the desired predetermined position of the driven unit one at a time, an assembly switch having a plurality of wipers adapted to be energized by the manually operated switches, and a circular switch member having a pair of segments spaced apart endwise to form a neutral point, said wipers being circularly spaced about the circular switch member in corresponding spaced relation to the said predetermined positions of the driven unit, a pair of relay circuits having a pair of brushes, one brush adapted to continuing sliding contact with one segment and the other brush adapted to continuing sliding contact with the other segment, a pair of relays, a pair of electric connections one between one brush and one relay and the other between the other brush and the other relay, said power control means comprising, a power operated member having a journaled shaft, gearing means adapted to rotate the shaft and a mechanical linkage coupled between said shaft and said driven unit, said circular switch member being rigidly affixed to said shaft, said power control circuit comprising, a series-shunt reversible electric motor adapted to drive said power control means in one direction until the neutral point is reached on the said circular switch member when one relay circuit is energized and in the opposite direction until the neutral point is reached on said circular switch member when the other relay circuit is energized.

2. Positioning apparatus for driven means, comprising, a manually operable selecting device, a switch assembly having a commutator provided with two segments spaced apart at their adjacent ends to form an insulated gap, a selector arm having a wiper to electrically contact said segments until the segments are moved to bring the insulated gap under the wiper, coupling means connecting the selecting device and the selector arm for movement of the latter by the former, a reversible electric motor, electrical connections between the segments and the motor for rotating the motor in one direction when the wiper contacts one segment and in the opposite direction when the wiper contacts the other segment, an out-put shaft, said commutator being affixed to said out-put shaft, a worm wheel affixed to said out-put shaft, said motor having a shaft, a worm on said motor shaft engaging said worm wheel, and a crank arm on the out-put shaft adapted for connection to driven means, whereby movement of the selecting device in either direction will move the wiper a corresponding amount on the commutator and cause the motor to be driven in a direction to bring the insulated gap under the wiper.

3. Positioning apparatus for driven means, comprising, a selecting device manually movable within a predetermined range, a switch assembly having a commutator provided with two segments spaced apart at their adjacent ends to form an insulated gap, a selector arm, a wiper on said selector arm to electrically contact said segments, a coupling means connecting the selecting device and the selector arm for movement of the latter from the former, a reversible electric motor having a series side and a shunt side, a relay for the series side and a relay for the shunt side, electric connection from the series relay to one of the said segments and electric connection from the shunt relay to the other segment, an out-put shaft, said commutator being fixed to said out-put shaft, a worm wheel fixed to said out-put shaft, said motor having a shaft, a worm on said motor shaft engaging said worm wheel, and a crank arm on the out-put shaft adapted for connection to driven means, whereby movement of the selecting device in either direction will move the wiper a corresponding amount on the commutator and cause the motor to be driven in a direction to bring the insulated gap under the wiper, and should the momentum of the motor cause any overrun the wiper will contact the opposite segment to again bring the insulated gap under the wiper and thus position the crank arm in related position to the selected position of the selecting device.

4. Positioning apparatus, comprising, a selecting device manually movable within a predetermined range, a casing having a shaft rotatably mounted therein, a selector arm rotatably mounted on said shaft, a wiper on said selector arm, a switch assembly member fixed on said shaft and having a commutator provided with two segments spaced apart at their adjacent ends to form an insulated gap, said wiper bearing against said segments for wiping contact therewith, connecting means connecting the selecting device and the selector arm for moving said arm by said device, a wheel fixed to rotate with said shaft, a reversible electric motor, gear connections between the motor and said wheel for rotating the wheel and shaft from the motor, electrical means for selectively reversing the rotation of the motor for moving the commutator to bring the insulated gap under the wiper after the wiper has been moved by said selecting device in either direction, and an out-put crank arm fixed to said shaft for connection to driven means.

References Cited in the file of this patent
UNITED STATES PATENTS

| | | |
|---|---|---|
| 2,272,431 | Rankin | Feb. 10, 1942 |
| 2,428,403 | Yardeny | Oct. 7, 1947 |